United States Patent
Niwa

(10) Patent No.: US 11,629,098 B2
(45) Date of Patent: Apr. 18, 2023

(54) CERAMIC POWDER MATERIAL, METHOD FOR PRODUCING CERAMIC POWDER MATERIAL, MOLDED BODY, SINTERED BODY, AND BATTERY

(71) Applicant: DAIICHI KIGENSO KAGAKU KOGYO CO., LTD., Osaka (JP)

(72) Inventor: Tadahiro Niwa, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 17/753,212

(22) PCT Filed: Dec. 6, 2021

(86) PCT No.: PCT/JP2021/044648
§ 371 (c)(1),
(2) Date: Feb. 23, 2022

(87) PCT Pub. No.: WO2022/065521
PCT Pub. Date: Mar. 31, 2022

(65) Prior Publication Data
US 2022/0388911 A1   Dec. 8, 2022

(30) Foreign Application Priority Data

Mar. 31, 2021 (JP) .............................. JP2021-060422

(51) Int. Cl.
*C04B 35/486* (2006.01)
*C04B 35/50* (2006.01)
*C04B 40/00* (2006.01)

(52) U.S. Cl.
CPC ............ *C04B 35/486* (2013.01); *C04B 35/50* (2013.01); *C04B 40/0046* (2013.01);
(Continued)

(58) Field of Classification Search
CPC .................. C04B 35/486; C04B 35/50; C04B 2235/3203; C04B 2235/3227;
(Continued)

(56) References Cited

U.S. PATENT DOCUMENTS 11,342,581 B2 * 5/2022 Niwa .................. H01M 50/434
2015/0118571 A1   4/2015 Liu et al.
(Continued)

FOREIGN PATENT DOCUMENTS

CN   106232526 A   12/2016
EP   3 135 634 A1   3/2017
(Continued)

OTHER PUBLICATIONS

"Decision to Grant a Patent" Office Action issued in JP 2021-060422; mailed by the Japanese Patent Office dated Jun. 29, 2021.
(Continued)

*Primary Examiner* — Karl E Group
*Assistant Examiner* — Cameron K Miller
(74) *Attorney, Agent, or Firm* — Studebaker & Brackett PC

(57) ABSTRACT

A ceramic powder material containing a garnet-type compound containing Li, wherein the ceramic powder material has a pore volume of 0.4 mL/g or more and 1.0 mL/g or less.

8 Claims, 2 Drawing Sheets

(52) U.S. Cl.
CPC ............... *C04B 2235/3203* (2013.01); *C04B 2235/3227* (2013.01); *C04B 2235/3244* (2013.01)

(58) Field of Classification Search
CPC ...... C04B 2235/3244; H01M 10/0525; H01M 2300/0071
See application file for complete search history.

(56) References Cited

U.S. PATENT DOCUMENTS

| | | | |
|---|---|---|---|
| 2016/0049688 A1 | 2/2016 | Sung et al. | |
| 2017/0047589 A1 | 2/2017 | Noi et al. | |
| 2018/0248223 A1 | 8/2018 | Kim et al. | |
| 2019/0084887 A1* | 3/2019 | Yamamoto | C04B 35/634 |
| 2021/0249686 A1 | 8/2021 | Niwa | |

FOREIGN PATENT DOCUMENTS

| | | |
|---|---|---|
| EP | 3 778 488 A1 | 2/2021 |
| JP | 2013-032259 A | 2/2013 |
| JP | 2013-243111 A | 12/2013 |
| JP | 2013-243112 A | 12/2013 |
| JP | 2017-511781 A | 4/2017 |
| JP | 2017-168396 A | 9/2017 |
| JP | 2021-020835 A | 2/2021 |
| WO | 2013/128759 A1 | 9/2013 |
| WO | 2015/163152 A1 | 10/2015 |
| WO | 2021/014905 A1 | 1/2021 |

OTHER PUBLICATIONS

Translation of International Search Report issued in PCT/JP2021/044648; dated Jan. 25, 2022, previously submitted in the IDS of Feb. 23, 2022.

Written Opinion of the International Searching Authority; PCT/JP2021/044648; dated Jan. 25, 2022.

The extended European search report issued by the European Patent Office dated Sep. 20, 2022, which corresponds to European Patent Application No. 21856920.0-1108 and is related to U.S. Appl. No. 17/753,212.

An Office Action mailed by the Chinese National Intellectual Property Administration dated Feb. 24, 2023, which corresponds to Chinese Patent Application No. 202180005590.5 and is related to U.S. Appl. No. 17/753,212; with English language translation.

* cited by examiner

CERAMIC POWDER MATERIAL, METHOD FOR PRODUCING CERAMIC POWDER MATERIAL, MOLDED BODY, SINTERED BODY, AND BATTERY

TECHNICAL FIELD

The present invention relates to a ceramic powder material, a method for producing a ceramic powder material, a molded body, a sintered body, and a battery.

BACKGROUND ART

Garnet is a cubic silicate mineral represented by a chemical composition $M^{2+}{}_3M^{3+}{}_2Si_3O_{12}$ ($M^{2+}$=Mg, Ca, Mn, or Fe, $M^{3+}$=Al, Cr, or Fe). Garnet-type compounds having a crystal structure similar to that of garnet are not limited to silicates, and all positions of $M^{2+}$, $M^{3+}$, and $Si^{4+}$ ions in the crystal structure can be replaced with ions of various valences. Hence, there are a wide variety of garnet-type compounds having a crystal structure similar to that of garnet. There are substances that are widely utilized in industry among chemically synthesized garnet-type compounds.

In recent years, among garnet-type compounds, $Li_7La_3Zr_2O_{12}$ (hereinafter, also referred to as "LLZ") and LLZ analogs in which various additive elements are introduced into LLZ are regarded as promising solid electrolyte materials for all-solid-state lithium-ion secondary batteries since these have a high lithium-ion conductance and exhibit high electrochemical stability with respect to lithium metal. All-solid-state lithium-ion secondary batteries are a next-generation secondary battery exhibiting ultimate safety since nonflammable solid electrolyte materials are used therein, and research and development of materials and devices are being actively carried out for practical application thereof (see, for example, Patent Documents 1 to 3). Hereinafter, LLZ and LLZ analogs are collectively referred to as "LLZ-based garnet-type compounds".

PRIOR ART DOCUMENTS

Patent Documents

Patent Document 1: JP-A-2013-32259
Patent Document 2: JP-A-2017-168396
Patent Document 3: JP-T-2017-511781

SUMMARY OF THE INVENTION

Problems to be Solved by the Invention

It is necessary to reduce the thickness of the electrolyte member in the all-solid-state battery or the semi-solid-state battery in order to reduce the resistance of the cell. Therefore, the powder as a raw material of the electrolyte member is required to be fine particles of several µm or less.

LLZ-based garnet-type compounds, which are one of the solid electrolyte materials, are naturally required to have similar physical properties. As a known technique for obtaining fine particles of a LLZ-based garnet-type compound, a method of pulverizing a powder material of a LLZ-based garnet-type compound synthesized by an arbitrary method with a strong mechanical crushing force such as wet pulverization is known. In this technique, fine particles having a particle size of 1 µm or less are obtained, but on the other hand, there is a disadvantage due to the use of a solvent. When water is used as the solvent, the properties of the material are greatly impaired along with moisture absorption and Li desorption. When an organic solvent is used, a large amount of organic solvent is used, and thus it is difficult to say that the method is an industrially excellent method from the viewpoint of cost and environmental load. From the above, it is considered that it is not preferable to use wet pulverization as a method for obtaining fine particles of the LLZ-based garnet-type compound.

However, the powder material of the LLZ-based garnet-type compound obtained by the known technique is very strong, and it is difficult to atomize the powder material without a strong crushing method such as wet pulverization. In addition, not only the LLZ-based garnet-type compound, but also the powder material of a garnet-type compound containing Li is very strong, and it is therefore difficult to atomize the powder material without a strong crushing method such as wet pulverization. This is because the powder material of the garnet-type compound containing Li is composed of particles of a high-density garnet-type compound with few voids.

The present invention has been made in view of the above-described problems, and an object thereof is to provide a ceramic powder material that contains a garnet-type compound containing Li and is easily pulverized. Another object of the present invention is to provide a method for producing the ceramic powder material. Another object of the present invention is to provide a molded body obtained by using the ceramic powder material. Another object of the present invention is to provide a sintered body obtained using the molded body. Another object of the present invention is to provide a battery including a sintered body obtained by sintering the ceramic powder material.

Means for Solving the Problems

Conventionally, in a synthesis process of garnet-type compounds containing Li such as a LLZ-based garnet-type compound, raw material powders are atomized in order to improve reactivity of various raw material powders. The atomization of the raw material powder improves the uniformity of elements, and thus the formation reaction of the garnet-type compound easily proceeds uniformly.

The present inventor has found that the conventional garnet-type compound is produced by the above process, and thus is composed of high-density particles without voids, resulting in impaired pulverizability. Thus, the present inventor has found that it is possible to obtain a ceramic powder material that is easily pulverized by controlling the pore characteristics of the obtained garnet-type compound, and have completed the present invention.

That is, the ceramic powder material according to the present invention contains:

a garnet-type compound containing Li, in which the ceramic powder material has a pore volume of 0.4 mL/g or more and 1.0 mL/g or less.

According to the above configuration, since the pore volume is 0.4 mL/g or more, it can be said that the ceramic powder material has relatively many voids and is fragile. Such compounds can be easily formed into fine particles without using a strong pulverization method.

In the above configuration, the average pore size is preferably 0.5 µm or more and 5 µm or less.

When the average pore size is 0.5 µm or more and 5 µm or less, it can be said that there are many fine pores. Therefore, atomization can be more easily performed.

In the above configuration, the specific surface area is preferably 0.5 m²/g or more and 2.5 m²/g or less.

When the specific surface area is 0.5 m²/g or more, it can be said that the particles of the ceramic powder material are fine. Since the particles are fine even before being crushed, the particles become finer by being crushed.

In the above configuration, the particle size $D_{50}$ is preferably 0.5 μm or more and 50 μm or less.

When the particle size $D_{50}$ is 50 μm or less, it can be said that the particles are relatively fine even before the crushing treatment. Therefore, when the crushing treatment is performed, more fine particles can be obtained.

In the above configuration, the garnet-type compound is preferably represented by Formula [1] below.

$$Li_{7-(3x+y)}M1_xLa_3Zr_{2-y}M2_yO_{12} \quad [1]$$

where M1 is Al or Ga, M2 is Nb or Ta, x is a number satisfying 0≤x≤0.35, and y is a value satisfying 0≤y≤1.0.

When the garnet-type compound is a compound represented by Formula [1], the ionic conductivity can be increased. Accordingly, it can be suitably used as a constituent member of a battery (in particular, a lithium-ion secondary battery).

In the above configuration, the particle size $D_{50}$ after a crushing treatment below is preferably 0.1 μm or more and 10 μm or less.

<Crushing Treatment>

To 40 mL of pure water, 0.1 g of the ceramic powder material is added, and a homogenizer treatment is performed for 5 minutes under <crushing conditions> below using an ultrasonic homogenizer, product name Digital Sonifier model 250 manufactured by Branson.

<Crushing Conditions>

Transmission frequency: 20 kHz
High frequency output: 200 W
Amplitude control: 40±5%

When the particle size $D_{50}$ after the crushing treatment is 10 μm or less, it can be said that the particles are fine particles. Further, the conditions of the crushing treatment are relatively gentle conditions. When the particle size $D_{50}$ after the crushing treatment is 10 μm or less, it can be said that the ceramic powder material has a property of being easily crushed into fine particles under gentle conditions.

The method for producing a ceramic powder material according to the present invention is a method for producing the ceramic powder material, including:

a first step of mixing a solution of a carbonic acid species with a solution containing a compound having La as a constituent element to obtain a solution containing a precipitate A;

a second step of mixing a solution containing a zirconium carbonate complex with a solution containing the precipitate A to obtain a precipitate B;

a third step of calcining the precipitate B at a temperature of 500° C. or more and 900° C. or less to obtain a precursor oxide;

a fourth step of preparing a mixture obtained by mixing the precursor oxide and a compound containing Li as a constituent element; and a fifth step of calcining the mixture at a temperature of 500° C. or more and 900° C. or less to obtain a garnet-type compound.

According to the production method, a ceramic powder material having a pore volume of 0.4 mL/g or more can be suitably obtained.

The molded body according to the present invention is obtained by crushing and then pressurizing the ceramic powder material.

The ceramic powder material can be easily crushed. Therefore, the molded body obtained by crushing and then pressurizing the ceramic powder material becomes a denser molded body.

In addition, the sintered body according to the present invention is obtained by sintering the molded body.

Since the molded body is dense, the sintered body obtained by sintering the molded body becomes dense.

The battery according to the present invention includes the sintered body.

Since the sintered body is dense, a battery (particularly, an all-solid-state lithium-ion secondary battery) including the sintered body is excellent as a battery.

Effect of the Invention

According to the present invention, a ceramic powder material that is easily pulverized can be provided. Another object of the present invention is to provide a method for producing the ceramic powder material. In addition, a molded body obtained using the ceramic powder material can be provided. In addition, a sintered body obtained using the molded body can be provided. It is also possible to provide a battery including a sintered body obtained by sintering the ceramic powder material.

MODE FOR CARRYING OUT THE INVENTION

Figure 1:
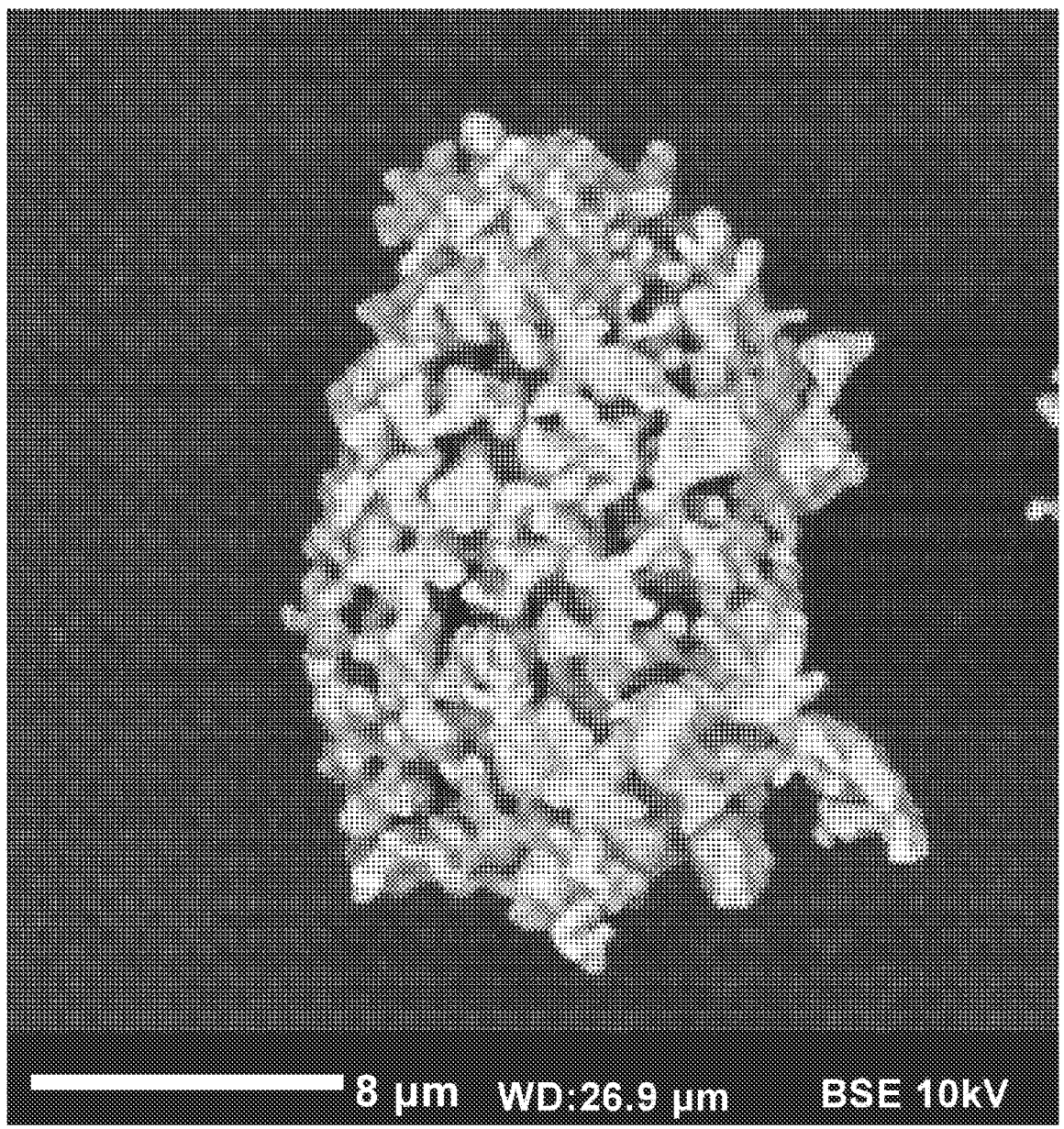
FIG. 1 is an SEM image of a ceramic powder material obtained in Example 1.

Hereinafter, embodiments of the present invention will be described. However, the present invention is not limited only to these embodiments.

[Ceramic Powder Material]

The ceramic powder material according to the present embodiment contains:

a garnet-type compound containing Li, in which the pore volume is 0.4 mL/g or more and 1.0 mL/g or less.

As described above, the ceramic powder material according to the present embodiment has a pore volume of 0.4 mL/g or more and 1.0 mL/g or less. The pore volume is preferably 0.5 mL/g or more, and more preferably 0.6 mL/g or more. The pore volume is preferably 1.0 mL/g or less, and more preferably 0.9 mL/g or less. Since the pore volume is 0.4 mL/g or more, it can be said that the ceramic powder material has relatively many voids and is fragile. Such compounds can be easily formed into fine particles without using a strong pulverization method.

The ceramic powder material preferably has an average pore size of 0.5 μm or more and 5 μm or less. The average pore size is preferably 1 μm or more, and more preferably 2 μm or more. The average pore size is more preferably 4 μm or less. When the average pore size is 0.5 μm or more and 5 μm or less, it can be said that there are many fine pores. Therefore, atomization can be more easily performed.

The ceramic powder material preferably has a pore specific surface area of 0.6 m²/g or more and 3 m²/g or less. The pore specific surface area is preferably 0.8 m²/g or more, and more preferably 1.0 m²/g or more. The pore specific surface area is preferably 2.5 m²/g or less, and more preferably 2 m²/g or less. When the pore specific surface area is 0.6 m²/g or more, it can be said that there are many fine pores. Therefore, atomization can be more easily performed.

Specific methods for measuring the pore volume, the average pore size, and the pore specific surface area are according to the method described in Examples.

The pore volume, the average pore size, and the pore specific surface area described in the present specification are values measured by a mercury intrusion method.

The ceramic powder material preferably has a specific surface area of 0.5 $m^2/g$ or more and 2.5 $m^2/g$ or less. The specific surface area is preferably 0.6 $m^2/g$ or more, and more preferably 0.7 $m^2/g$ or more. The specific surface area is preferably 2 $m^2/g$ or less, and more preferably 1.5 $m^2/g$ or less. When the specific surface area is 0.5 $m^2/g$ or more, it can be said that the particles of the ceramic powder material are fine. Since the particles are fine even before being crushed, the particles become finer by being crushed. In the present specification, the specific surface area refers to a BET specific surface area.

A specific method for measuring the specific surface area is the method described in Examples.

The ceramic powder material preferably has a particle size $D_{10}$ of 0.2 μm or more and 10 μm or less. The particle size $D_{10}$ is preferably 9 μm or less, and more preferably 8 μm or less. The particle size $D_{10}$ is preferably as small as possible, but is, for example, 0.5 μm or more, 0.8 μm or more, or the like. When the particle size $D_{10}$ is 10 μm or less, it can be said that the particles are relatively fine even before the crushing treatment. Therefore, when the crushing treatment is performed, more fine particles can be obtained.

The ceramic powder material preferably has a particle size $D_{50}$ (median size) of 0.5 μm or more and 50 μm or less. The particle size $D_{50}$ is preferably 1 μm or more, more preferably 2 μm or more, and still more preferably 3 μm or more. The particle size $D_{50}$ is preferably 40 μm or less, and more preferably 30 μm or less. When the particle size $D_{50}$ is 50 μm or less, it can be said that the particles are relatively fine even before the crushing treatment. Therefore, when the crushing treatment is performed, more fine particles can be obtained.

The ceramic powder material preferably has a particle size $D_{90}$ of 50 μm or more and 250 μm or less. The particle size $D_{90}$ is preferably 75 μm or more, and more preferably 90 μm or more. The particle size $D_{90}$ is preferably 200 μm or less, and more preferably 170 μm or less. When the particle size $D_{90}$ is 250 μm or less, it can be said that the particles are relatively fine even before the crushing treatment. Therefore, when the crushing treatment is performed, more fine particles can be obtained.

The ceramic powder material preferably has a mode size (most frequent particle size) of 1 μm or more and 30 μm or less. The mode size is preferably 3 μm or more, and more preferably 5 μm or more. The mode size is preferably 20 μm or less, and more preferably 15 μm or less. When the mode size is 30 μm or less, it can be said that the particles are relatively fine even before the crushing treatment. Therefore, when the crushing treatment is performed, more fine particles can be obtained.

The ceramic powder material preferably has an average size (volume-based average size) of 10 μm or more and 100 μm or less. The average size is preferably 20 μm or more, and more preferably 30 μm or more. The average size is preferably 80 μm or less, and more preferably 60 μm or less. When the average size is 100 μm or less, it can be said that the particles are relatively fine even before the crushing treatment. Therefore, when the crushing treatment is performed, more fine particles can be obtained.

The ceramic powder material preferably has an integrated fraction of a particle size of 10 μm or less of 5% or more and 90% or less. The integrated fraction of the particle size of 10 μm or less is preferably 10% or more, more preferably 15% or more, and still more preferably 20% or more. In addition, the integrated fraction of the particle size of 10 μm or less is preferably 85% or less, more preferably 80% or less, still more preferably 70% or less, particularly preferably 60% or less, and especially preferably 50% or less. When the integrated fraction of the particle size of 10 μm or less is 5% or more, it can be said that the particles are relatively fine even before the crushing treatment. Therefore, when the crushing treatment is performed, more fine particles can be obtained.

Specific methods for measuring the particle size $D_{10}$, the particle size $D_{50}$, the particle size $D_{90}$, the mode size, the average size, the integrated fraction of the particle size of 1 μm or less, the integrated fraction of the particle size of 5 μm or less, and the integrated fraction of the particle size of 10 μm or less are according to the method described in Examples.

The particle size $D_{10}$, the particle size $D_{50}$, the particle size $D_{90}$, the mode size, the average size, the integrated fraction of the particle size of 1 μm or less, the integrated fraction of the particle size of 5 μm or less, and the integrated fraction of the particle size of 10 μm or less described in the present specification are values measured on a volume basis.

The ceramic powder material preferably has a particle size $D_{50}$ of 0.1 μm or more and 10 μm or less after the following crushing treatment. The particle size $D_{50}$ after the crushing treatment is smaller than the particle size $D_{50}$ before the crushing treatment. The particle size $D_{50}$ after the crushing treatment is preferably 0.5 μm or more, and more preferably 1 μm or more. The particle size $D_{50}$ after the crushing treatment is more preferably 8 μm or less. When the particle size $D_{50}$ after the crushing treatment is 10 μm or less, it can be said that the particles are fine particles. Further, the conditions of the crushing treatment are relatively gentle conditions. When the particle size $D_{50}$ after the crushing treatment is 10 μm or less, it can be said that the ceramic powder material has a property of being easily crushed into fine particles under gentle conditions. A specific method for measuring the particle size $D_{50}$ after the crushing treatment is according to the method described in Examples. The particle size $D_{50}$ after the crushing treatment described in the present specification is a value measured on a volume basis.

<Crushing Treatment>

To 40 mL of pure water, 0.1 g of the ceramic powder material is added, and a homogenizer treatment is performed for 5 minutes under <crushing conditions> below using an ultrasonic homogenizer, product name Digital Sonifier model 250 manufactured by Branson.

<Crushing Conditions>

Transmission frequency: 20 kHz

High frequency output: 200 W

Amplitude control: 40±5%

The ceramic powder material preferably has an integrated fraction of a particle size of 10 μm or less after the following crushing treatment of 60% or more and 100% or less. The integrated fraction of the particle size of 10 μm or less after the crushing treatment is preferably 70% or more, and more preferably 80% or more. The integrated fraction of the particle size of 10 μm or less after the crushing treatment is preferably 99.5% or less, more preferably 99% or less, still more preferably 98% or less, and particularly preferably 97.5% or less.

When the integrated fraction of the particle size of 10 μm or less after the crushing treatment is 60% or more, it can be said that the particles are fine particles. Further, the conditions of the crushing treatment are relatively gentle conditions. When the integrated fraction of the particle size of 10 μm or less after the crushing treatment is 60% or more, it can be said that the ceramic powder material has a property of being easily crushed into fine particles under gentle conditions. A specific method for measuring the integrated fraction of the particle size of 10 μm or less after the crushing treatment is the method described in Examples. The integrated fraction of the particle size of 10 μm or less after the crushing treatment described in the present specification is a value measured on a volume basis.

<Crushing Treatment>

To 40 mL of pure water, 0.1 g of the ceramic powder material is added, and a homogenizer treatment is performed for 5 minutes under <crushing conditions> below using an ultrasonic homogenizer, product name Digital Sonifier model 250 manufactured by Branson.

<Crushing Conditions>

Transmission frequency: 20 kHz
High frequency output: 200 W
Amplitude control: 40±5%

[Garnet-Type Compound Containing Li]

As described above, the ceramic powder material according to the present embodiment contains a garnet-type compound containing Li (hereinafter, also simply referred to as "garnet-type compound"). The garnet-type compound is not particularly limited as long as it contains a Li atom and exhibits the same crystal structure as garnet.

The content of the garnet-type compound in the ceramic powder material is preferably 50% by mass or more. The content is more preferably 70% by mass or more, still more preferably 90% by mass or more, and particularly preferably 95% by mass or more. When the content of the garnet-type compound is 80% by mass or more, the pore volume of the ceramic powder material is likely to be 0.4 mL/g or more and 1.0 mL/g or less.

The garnet-type compound preferably contains one or more elements selected from the group consisting of aluminum, gallium, yttrium, cerium, calcium, barium, strontium, niobium, and tantalum.

When the garnet-type compound contains one or more elements selected from the group consisting of aluminum, gallium, yttrium, cerium, calcium, barium, strontium, niobium, and tantalum, it is possible to adjust the characteristics of the ceramic powder material to the characteristics according to the required characteristics.

Among them, the garnet-type compound is preferably represented by Formula [1] below.

$$Li_{7-(3x+y)}M1_xLa_3Zr_{2-y}M2_yO_{12} \qquad [1]$$

where M1 is Al or Ga, M2 is Nb or Ta, x is a number satisfying $0 \le x \le 0.35$, and y is a value satisfying $0 \le y \le 1.0$.

From the viewpoint of ionic conductivity, x is preferably more than 0, more preferably 0.15 or more, and still more preferably 0.20 or more. From the viewpoint of ionic conductivity, x is preferably less than 0.35, more preferably 0.3 or less, and still more preferably 0.28 or less.

From the viewpoint of ionic conductivity, y is preferably more than 0, more preferably 0.2 or more, and still more preferably 0.3 or more. From the viewpoint of ionic conductivity, y is preferably less than 1.0, more preferably 0.8 or less, and still more preferably 0.6 or less.

When the garnet-type compound is a compound represented by Formula [1], the ionic conductivity can be increased. Accordingly, it can be suitably used as a constituent member of a battery (in particular, a lithium-ion secondary battery).

The ceramic powder material may contain a compound other than the garnet-type compound. Examples of the compound other than the garnet-type compound (garnet-type compound containing Li) include garnet-type compounds containing no Li.

[Method for Producing Ceramic Powder Material]

Hereinafter, an example of a method for producing a ceramic powder material will be described. However, the method for producing a ceramic powder material of the present invention is not limited to the following example.

The method for producing a ceramic powder material according to the present embodiment is a method for producing a ceramic powder material containing a garnet-type compound containing Li and having a pore volume of 0.4 mL/g or more and 1.0 mL/g or less:

the method including:

a first step of mixing a solution of a carbonic acid species with a solution containing a compound having La as a constituent element to obtain a solution containing a precipitate A;

a second step of mixing a solution containing a zirconium carbonate complex with a solution containing the precipitate A to obtain a precipitate B;

a third step of calcining the precipitate B at a temperature of 500° C. or more and 900° C. or less to obtain a precursor oxide;

a fourth step of preparing a mixture obtained by mixing the precursor oxide and a compound containing Li as a constituent element; and a fifth step of calcining the mixture at a temperature of 500° C. or more and 900° C. or less to obtain a garnet-type compound.

<First Step>

In the method for producing a ceramic powder material according to the present embodiment, first, a solution of a carbonic acid species and a solution containing a compound having La as a constituent element are mixed to obtain a precipitate (hereinafter, also referred to as "lanthanum carbonate compound") which is a carbonate of La.

The carbonic acid species refers to at least one of carbonic acid ($H_2CO_3$), hydrogencarbonate ion ($HCO_3^-$), or carbonate ion ($CO_3^{2-}$).

Examples of the solution of a carbonic acid species include a solution of a compound containing a carbonic acid species. Examples of the compound containing a carbonic acid species include ammonium hydrogencarbonate, lithium hydrogencarbonate, tetramethylammonium hydrogencarbonate, ammonium carbonate, and carbonic acid gas. Any one of these can be used singly or these can be used in combination of arbitrary two or more thereof.

Examples of the compound (hereinafter, also referred to as "La source") containing La as a constituent element include a water-soluble salt of La element. Examples of the water-soluble salt of La element include lanthanum nitrate, lanthanum acetate, lanthanum chloride, and hydrates thereof. The compounds exemplified above can be used singly or in combination of arbitrary two or more thereof and dissolved in pure water or the like to obtain an aqueous solution in which a La source is dissolved.

The La source may be in a solid state or in a solution state. In a case where the La source is in the form of a solution, the solvent of the La source may be water alone or a mixed solvent of water and an organic solvent such as an alcohol, but is preferably water alone from the viewpoint of not using an organic solvent in the entire production. In other words, the La source is preferably an aqueous solution in a case where the La source is in the form of a solution.

When the La source is dissolved in water, the pH of the aqueous solution may be adjusted using an acid such as nitric acid or hydrochloric acid.

In the first step, a compound (hereinafter, also referred to as "compound containing element $M^0$ as a constituent element" or "$M^0$ source") containing one or more elements selected from the group consisting of aluminum, gallium, yttrium, cerium, calcium, barium, strontium, niobium, and tantalum as a constituent element may be mixed.

From the viewpoint of increasing the ionic conductivity, the $M^0$ source is preferably a compound containing Nb as a constituent element, a compound containing Ta as a constituent element, a compound containing Al as a constituent element, or a compound containing Ga as a constituent element.

Examples of the $M^0$ source include water-soluble salts of the element $M^0$. Examples of the water-soluble salt of the element $M^0$ include nitrates, acetates, chlorides, oxides, hydroxides, oxalates, and ammonium salts of the element $M^0$. The compounds exemplified above can be used singly or in combination of arbitrary two or more thereof and dissolved in pure water or the like to obtain an aqueous solution in which an $M^0$ source is dissolved.

In a case where the La source is in the form of a solution, the $M^0$ source may be dissolved in the solution of the La source.

In a case where the $M^0$ source is dissolved in the solution of the carbonic acid species, the $M^0$ source may be dissolved in advance in the solution of the carbonic acid species and then mixed with a La source or the like.

The first step has been described above.

<Second Step>

In the second step, a solution containing a zirconium carbonate complex is mixed with a solution containing the precipitate A (lanthanum carbonate compound) to obtain a precipitate B. This makes it possible to uniformly coat the surface of the precipitate (lanthanum carbonate compound) with a Zr component.

The solution containing a zirconium carbonate complex can be prepared by mixing at least a compound containing a carbonic acid species and a compound containing a zirconium species (Zr species).

Examples of the compound containing a carbonic acid species include ammonium hydrogencarbonate, lithium hydrogencarbonate, tetramethylammonium hydrogencarbonate, ammonium carbonate, and carbonic acid gas. Any one of these can be used singly or these can be used in combination of arbitrary two or more thereof.

The Zr species means zirconium or a zirconium ion. Hereinafter, the compound containing a Zr species is also referred to as "Zr source".

Specific examples of the Zr source include crystals of ammonium zirconium carbonate $((NH_4)_3Zr(OH)(CO_3)_3 \cdot 2H_2O)$, basic zirconium carbonate $(Zr(OH)_{(4-2n)}(CO_3)_n \cdot mH_2O$, n=0.2 to 1.0, m=1 to 10), zirconium oxychloride $(ZrOCl_2)$, or zirconium oxynitrate $(ZrO(NO_3)_2)$, but the Zr source is not limited thereto. Any one of these Zr sources can be used singly or these Zr sources can be used in combination of arbitrary two or more thereof. When the Zr source is the above-described zirconium oxychloride, zirconium oxynitrate and the like, hydrates thereof may be used.

The solution containing a zirconium carbonate complex can also be prepared using a compound containing both a carbonic acid species and a Zr species. Examples of the compound containing both a carbonic acid species and a Zr species as used herein include the above-described crystals of ammonium zirconium carbonate $((NH_4)_3Zr(OH)(CO_3)_3 \cdot 2H_2O)$ and basic zirconium carbonate $(Zr(OH)_{(4-2n)}(CO_3)_n \cdot mH_2O$, n=0.2 to 1.0, m=1 to 10). Such a compound containing both a carbonic acid species and a Zr species can be handled as a compound containing a carbonic acid species as well as a Zr source.

In preparation of the solution containing a zirconium carbonate complex, it is preferable to mix the compound containing a carbonic acid species with the Zr source so that the molar ratio of the carbonic acid species to the zirconium species, namely, the value of [number of moles of carbonic acid species/number of moles of zirconium species] is in a range of 1.5 or more and 15.0 or less. This mixing may be performed by mixing the two in a solid state as they are and then dispersing the mixture in a solvent or by a method in which solutions of the two are mixed together. In the case of preparing the solution containing a zirconium carbonate complex using a compound containing both a carbonic acid species and a Zr species, the solution containing a zirconium carbonate complex can be prepared by dissolving this compound in a solvent. In this case, the type of the compound containing both a carbonic acid species and a Zr species may be selected so that the value of the molar ratio [number of moles of carbonic acid species/number of moles of zirconium species] is in a range of 1.5 or more and 15.0 or less, preferably 2.0 or more and 14.0 or less.

Here, the molar ratio, [number of moles of carbonic acid species/number of moles of zirconium species] is defined in more detail as the value (number of moles of carbonic acid species/number of moles of zirconium species) obtained by dividing the number of moles of carbonic acid species contained in all the raw materials used to prepare the solution of a zirconium carbonate complex by the number of moles of Zr element contained in the Zr source. It is taken into consideration that carbonic acid species and $NR_4^+$ species to be described later may slightly volatilize from the finally prepared aqueous solution to cause a change in concentration. In a case where crystals of ammonium zirconium carbonate or basic zirconium carbonate are used as the Zr source, the number of moles of carbonic acid species contained therein is also taken into consideration when the molar ratio is calculated.

When a compound containing a carbonic acid species and a Zr source are mixed in the above molar ratio range, the carbonic acid species coordinates the zirconium (IV) ion. For example, in a case where the carbonic acid species is $CO_3^{2-}$, it is considered that a Zr monomeric complex ion $[Zr(CO_3)_n]^{(2n-4)-}$ {9≥n≥4}, a Zr dimeric complex ion $[Zr_2(OH)_2(CO_3)_6]^{6-}$ and the like are formed. A solution containing a zirconium carbonate complex is thus obtained. In the case of using a compound containing both a carbonic acid species and a Zr species as well, a solution containing a zirconium carbonate complex is obtained by forming the above-described complex ions. The formation of the zirconium carbonate complex ion can be confirmed by analyzing information on the coordination number, coordination distance, and local structure obtained by extended X-ray absorption fine structure (EXAFS) measurement, Raman spectroscopy, nuclear magnetic resonance (NMR) measurement and the like.

The molar ratio [number of moles of carbonic acid species/number of moles of zirconium species] is more preferably 3.0 or more and 7.0 or less, and a more stable zirconium carbonate complex is formed in this case.

In the solution containing a zirconium carbonate complex, at least one of the counter cations of the zirconium carbonate complex ion is set to $NR_4^+$. Here, R is at least one or more substituents selected from the group consisting of H, $CH_3$, and $CH_2CH_2OH$, Rs may be all the same as one another or all or some of Rs may be different from one another. Coexistence with $NR_4^+$ cation allows zirconium carbonate complex ion to more stably exist in the solution. Specific examples of $NR_4^+$ include ammonium ion ($NH_4^+$), tetramethylammonium ion (($CH_3)_4N^+$), and 2-hydroxyethyltrimethylammonium ion (($CH_3)_3N(CH_2CH_2OH)^+$), but $NR_4^+$ is not limited thereto. Among these, ammonium ion ($NH_4^+$) is preferable as $NR_4^+$ from the viewpoint of low price of the raw material. In order to set $NR_4^+$ as the counter cation of the zirconium carbonate complex ion, for example, a material capable of providing $NR_4^+$ to the solution may be added when the solution containing a zirconium carbonate complex ion is prepared. Examples of the material capable of providing $NR_4^+$ to the solution include ammonium hydroxide ($NH_4OH$, ammonia water), tetramethylammonium hydroxide (($CH_3)_4N(OH)$), and choline hydroxide (($CH_3)_3N(CH_2CH_2OH)$ (OH)), but the material capable of providing $NR_4^+$ to the solution is not limited thereto. These can be used singly or in combination of arbitrary two or more thereof. As the material capable of providing $NR_4^+$ to the solution, any one or more of ammonium hydrogencarbonate, tetramethylammonium hydrogencarbonate, ammonium carbonate or the like may be used concurrently.

In preparation of the solution containing a zirconium carbonate complex, compounds other than the compound containing a carbonic acid species and the Zr source, for example, a chelating agent may be added as long as the formation of the zirconium carbonate complex is not inhibited. The existence of chelating agent improves the stability of the aqueous solution of zirconium carbonate complex and can suppress the consumption of Zr due to autohydrolysis. Examples of the chelating agent include ethanolamines such as monoethanolamine, diethanolamine, and triethanolamine and organic acids such as tartaric acid, citric acid, lactic acid, gluconic acid, and glycolic acid or salts of ethanolamines and salts of organic acids. These can be used singly or two or more thereof can be used concurrently. The molar ratio (chelating agent/Zr) of the chelating agent to zirconium can be set to 0.01 to 1.

The pH of the solution containing a zirconium carbonate complex is preferably 7.0 or more and 9.5 or less. When the pH is 7.0 or more, the solution containing a zirconium carbonate complex can efficiently form a precipitate with an acidic aqueous solution. When the pH is 9.5 or less, the concentration of free hydroxide ions existing in the solution of a zirconium carbonate complex is sufficiently low and the generation of precipitate as a hydroxide can be suppressed. The pH can be adjusted by the blending ratio of various raw materials for preparation of the solution of a zirconium carbonate complex and the amount of solvent, and the pH may be adjusted by addition of a pH adjusting agent and the like.

In the second step, it is preferable to adjust the pH of the solution containing the precipitate B to fall within a range of 9.0 or more and 11.0 or less after preparing the precipitate B. For adjustment of the pH, ammonia water, an aqueous sodium hydroxide solution, or the like can be used. When the pH is 9.0 or more, elution of Zr can be further suppressed. When the pH is 11.0 or less, elution of La can be further suppressed. The pH can be adjusted by the blending ratio of various raw materials for preparation of the solution containing the precipitate B and the amount of solvent, and the pH may be adjusted by addition of ammonia water, or the like.

In the second step, after the precipitate B is prepared and the pH thereof is adjusted as necessary, heating may be performed at a temperature in a range of 90 to 200° C. The heating time is preferably 30 to 60 minutes. The yield of Zr can be improved by performing the heating.

Thereafter, the obtained slurry containing the precipitate B is suction-filtered, the filtered substance is washed with pure water or the like, and moisture is removed to separate the precipitate B from the slurry.

<Third Step>

In the third step, the precipitate B is calcined at a temperature of 500° C. or more and 900° C. or less to obtain a precursor oxide. The calcination retention time is preferably 1 to 15 hours.

<Fourth Step>

In the fourth step, a mixture obtained by mixing the precursor oxide and a compound containing Li as a constituent element is prepared.

At the time of mixing, the mixture may be pulverized. However, the pore volume in the resulting ceramic powder material is equivalent regardless of whether the mixture is pulverized or not. That is, the pulverization of the mixture is not essential. In Examples described below, the mixture is pulverized in order to obtain an SEM image as shown in FIG. 1.

Examples of the compound containing Li as a constituent element (hereinafter, also referred to as "Li source") include lithium oxide, lithium hydroxide, lithium chloride, lithium carbonate, lithium hydrogencarbonate, lithium nitrate, lithium sulfate, lithium acetate, lithium citrate ($Li_3C_6H_5O_7$), and lithium oxalate ($Li_2(COO)_2$), but the compound containing Li as a constituent element is not limited thereto. In the case of using various Li salts exemplified above as the Li source, the Li source may be hydrates thereof.

<Fifth Step>

In the fifth step, the mixture is calcined at a temperature of 500° C. or more and 900° C. or less to obtain a garnet-type compound. Calcination can be performed in an air atmosphere, for example. The calcination temperature is preferably 600° C. or more, and more preferably 700° C. or more. The calcination temperature is preferably 850° C. or less, and more preferably 800° C. or less. The calcination retention time is preferably 1 to 15 hours. The calcined product obtained is a ceramic powder material containing a garnet-type compound. Moreover, the ceramic powder material obtained by performing calcination at a temperature of 900° C. or less may be in the form of particles. It can be confirmed that the ceramic powder material which is the calcined product obtained is in the form of particles by scanning electron microscopy.

The ceramic powder material contains a garnet-type compound produced from a precursor oxide with reduced grain growth and aggregations having a size of about 5 to 15 μm, and thus can achieve a pore volume of 0.4 mL/g or more.

Examples of the method for obtaining the precursor oxide having aggregations with a size of about 5 to 15 μm include a method in which the precipitate A (lanthanum salt) forming the skeleton of the precursor oxide is coarsened to some extent in the first step.

Specifically, in the first step, the speed at the time of adding the La source to the solution of the carbonic acid species is increased, the stirring speed is reduced, the concentration of the La source solution is increased, the temperature at the time of charging the La source is increased, the concentration on the basic solution side is increased, and the like.

More specifically, the speed at the time of adding the La source is set to 5 to 10 g/min with respect to 100 mL of the solution of the carbonic acid species, the concentration of the La source solution is set to 10 to 20% by mass, the temperature at the time of charging the La source is set to 40 to 90° C., the concentration on the basic solution side is set to 10 to 20% by mass, and the like.

Examples of the method for obtaining the precursor oxide in which the grain growth is suppressed include a method in which the surface of the precipitate A (lanthanum salt) is uniformly coated with Zr element in the second step. In order to uniformly coat the surface of the precipitate A (lanthanum salt) with the Zr element, relatively gentle conditions are preferable.

Specifically, in the second step, the timing of adding a solution containing a zirconium carbonate complex to the precipitate A, the temperature at the time of addition, the temperature rise at the time of addition, aging, pH adjustment, and the like are exemplified.

More specifically, the temperature at the time of adding the solution containing the zirconium carbonate complex to the precipitate A is set to 40 to 90° C., the aging time after the temperature rise is set to 30 to 180 minutes, the pH is set in a range of 9 to 11, and the like.

An example of the method for producing a ceramic powder material has been described above.

[Molded Body]

The molded body according to the present embodiment is obtained by crushing the ceramic powder material and then pressurizing the resulting material. The ceramic powder material can be easily crushed. Therefore, the molded body obtained by crushing and then pressurizing the ceramic powder material becomes a denser molded body.

Here, the ceramic powder material has a pore volume of 0.4 mL/g or more and 1.0 mL/g or less, and can be easily atomized without using a strong crushing method. Therefore, the crushing condition is preferably a relatively gentle condition. Examples of the crushing condition include a ball mill and a vibration mill.

The molding pressure is not particularly limited, and may be 0.5 t/cm$^2$ or more and 5 t/cm$^2$ or less, 0.8 t/cm$^2$ or more and 2 t/cm$^2$ or less, or the like.

When the ceramic powder material after the crushing is molded, a commercially available molding machine or a cold isostatic pressing method (CIP) can be adopted. Molding may be performed by temporarily molding the ceramic powder material after crushing by a molding machine and then performing main-molding by press molding such as CIP.

In the production of the molded body, after the ceramic powder material is crushed and before the crushed material is pressurized, a binder may be added as necessary to improve moldability.

The binder is preferably an organic binder. The organic binder is likely to be removed from the molded body in a heating furnace in an oxidizing atmosphere, and a degreased body can be obtained, whereby finally, impurities are less likely to remain in the sintered body.

Examples of the organic binder include those that are soluble in alcohol, or those that are soluble in mixed solutions of two or more selected from the group consisting of alcohols, water, aliphatic ketones, and aromatic hydrocarbons. Examples of the organic binder include at least one selected from the group consisting of polyethylene glycol, glycol fatty acid ester, glycerol fatty acid ester, polyvinyl butyral, polyvinyl methyl ether, polyvinyl ethyl ether, and vinyl propionate. The organic binder may further contain one or more thermoplastic resins that are insoluble in alcohols, or the mixed solutions.

[Sintered Body]

The sintered body according to the present embodiment is obtained by sintering the molded body described above. The heat treatment temperature and time during the sintering are not particularly limited, but are preferably about 950 to 1,300° C. for about 1 to 5 hours.

The density of the sintered body is preferably 4.6 g/cm$^3$ or more, and 5.5 g/cm$^3$ or less. The density is more preferably 4.8 g/cm$^3$ or more, and still more preferably 5.0 g/cm$^3$ or more. The density is more preferably 5.3 g/cm$^3$ or less, and still more preferably 5.2 cm$^3$ or less.

It is preferable that the lithium-ion conductivity of the sintered body at a measurement temperature of 30° C. is $1\times10^{-5}$ S/cm or more and $3\times10^{-3}$ S/cm or less. The lithium-ion conductivity is more preferably $7\times10^{-5}$ S/cm or more, and still more preferably $1\times10^{-4}$ S/cm or more. The lithium-ion conductivity is preferably as high as possible, and is, for example, $2\times10^{-3}$ S/cm or less, $1.5\times10^{-3}$ S/cm or less, or the like.

The activation energy (Ea) of lithium-ion conduction of the sintered body is preferably 42 kJ/mol or less. The activation energy (Ea) of the lithium-ion conduction is more preferably 38 kJ/mol or less, and still more preferably 34 kJ/mol or less. It is more preferable as the activation energy (Ea) of the lithium-ion conduction is lower, but the activation energy (Ea) of the lithium-ion conduction can be set to, for example, 15 kJ/mol or more, 18 kJ/mol or more, or the like.

[All-Solid-State Lithium-Ion Secondary Battery]

Next, an example of the embodiment of an all-solid-state lithium-ion secondary battery will be described.

The all-solid-state lithium-ion secondary battery of the present embodiment includes:

a positive electrode layer containing a positive electrode active material;

a negative electrode layer containing a negative electrode active material; and a solid electrolyte layer interposed between the positive electrode layer and the negative electrode layer.

At least one of the positive electrode layer, the negative electrode layer, or the solid electrolyte layer includes the sintered body.

Hereinafter, the all-solid-state lithium-ion secondary battery of the present embodiment will be described for every configuration.

(Positive Electrode Layer)

The positive electrode layer is a layer containing at least a positive electrode active material and may further contain at least one of a lithium-ion conductive material, an electron conduction auxiliary, or a binder if necessary.

The lithium-ion conductive material contained in the positive electrode layer is preferably a sintered body obtained by sintering the ceramic powder material described above. The content of the sintered body in the positive electrode layer is not particularly limited but can be, for example, in a range of 0.1% by volume to 80% by volume with respect to the entire volume of the positive electrode layer. Among these, the content is preferably in a range of 1% by volume to 60% by volume, and more preferably in a range of 10% by volume to 50% by volume. The thickness of the positive electrode layer is not particularly limited but is preferably in a range of, for example, 0.1 μm to 1,000 μm. It is difficult to increase the capacity of the all-solid-state lithium-ion secondary battery when the positive electrode layer is thinner than 0.1 μm, and it is difficult to form a homogeneous layer when the positive electrode layer has a thickness exceeding 1,000 μm.

The positive electrode active material is not particularly limited as long as it is a material capable of storing and releasing electrochemical Li ions, but it is preferable to use sulfur or lithium sulfide ($Li_2S$) having a large theoretical capacity from the viewpoint of increasing the capacity of the all-solid-state lithium-ion secondary battery. A Li-containing oxide material may be used from the viewpoint of increasing the operating voltage of the all-solid-state lithium-ion secondary battery. Specifically, it is possible to use layered rock salt-type oxides such as $LiCoO_2$, $LiMnO_2$, $LiNiO_2$, $LiVO_2$, $Li(Ni_xCo_yMn_z)O_2(x+y+z=1)$, and $Li(Ni_xCo_yAl_z)O_2(x+y+z=1)$, spinel-type oxides such as $LiMn_2O_4$ and $Li(Ni_{0.5}Mn_{1.5})O_4$, olivin-type phosphates such as $LiFePO_4$, $LiMnPO_4$, $LiNiPO_4$, and $LiCuPO_4$, and silicates such as $Li_2FeSiO_4$ and $Li_2MnSiO_4$. As the positive electrode active material, the above-described materials may be used singly or in combination of arbitrary two or more thereof.

The content of the positive electrode active material in the positive electrode layer is preferably in a range of, for example, 10% by volume to 99% by volume with respect to the entire volume of the positive electrode layer. The content is more preferably in a range of 20% by volume to 99% by volume. The shape of the positive electrode active material can be, for example, a particle shape. The average particle size thereof is preferably in a range of, for example, 0.05 μm to 50 μm.

The positive electrode layer may further contain at least one of an electron conduction auxiliary or a binder in addition to the positive electrode active material and the lithium-ion conductive material. As the electron conduction auxiliary, a material exhibiting high electron conductivity is preferable, and examples thereof include acetylene black, ketjen black, and carbon fibers. As the binder, for example, polyvinylidene fluoride, polytetrafluoroethylene, polyvinyl alcohol, polyvinyl acetate, polymethylmethacrylate, and polyethylene can be used.

The positive electrode layer can be fabricated by mixing the components (the above-described positive electrode active material, lithium-ion conductive material, electron conduction auxiliary, binder and the like) and molding the mixture. At this time, sintering may be performed if necessary. The method for mixing the components of the positive electrode layer is not particularly limited, and any general powder technique can be used. At this time, water or arbitrary organic solvents may be used as the dispersion solvent. The method for molding and sintering the mixture of the components of the positive electrode layer is not particularly limited, and generally known molding and sintering methods can be used. The positive electrode layer may be fabricated on the solid electrolyte layer. In this case, sintering of the positive electrode layer can be performed in the form of integral sintering with the solid electrolyte layer. Here, integral sintering is a method in which one of the "lithium-ion conductive material constituting the solid electrolyte layer" or the "mixture of the components of the positive electrode layer" is molded, the other is molded thereon, pressing is performed if necessary, and then sintering is performed.

The positive electrode current collector for collecting electrical power of the positive electrode layer can be provided, for example, on the surface on the opposite side to the surface on which the solid electrolyte layer is disposed of the positive electrode layer. Examples of the material for the positive electrode current collector include stainless steel, aluminum, nickel, iron, and carbon. Among these, stainless steel is preferable.

(Negative Electrode Layer)

The negative electrode layer is a layer containing at least a negative electrode active material and may further contain at least one of a lithium-ion conductive material, an electron conduction auxiliary, or a binder if necessary.

The lithium-ion conductive material contained in the negative electrode layer is preferably the sintered body described above (a sintered body obtained by sintering the ceramic powder material described above). The content of the sintered body in the negative electrode layer is not particularly limited but can be, for example, in a range of 0.1% by volume to 80% by volume with respect to the entire volume of the negative electrode layer. Among these, the content is preferably in a range of 1% by volume to 60% by volume, and more preferably in a range of 10% by volume to 50% by volume. The thickness of the negative electrode layer is not particularly limited, but is preferably in a range of, for example, 0.1 μm to 1,000 μm.

The negative electrode active material is not particularly limited as long as it is a material capable of storing and releasing electrochemical Li ions, but it is preferable to use a metal material having a large theoretical capacity from the viewpoint of increasing the capacity of the all-solid-state lithium-ion secondary battery. Examples of the metal material include metals such as Li, Si, Sn, and In and alloys thereof. Among these, metal Li has the largest theoretical capacity and is thus preferable. Ti-based materials such as titanium oxide and lithium titanate that are excellent in reversible operation of the battery may be used. Specific examples of Ti-based materials include $TiO_2$, $H_2Ti_{12}O_{25}$, and $Li_4Ti_5O_{12}$. Inexpensive carbon-based materials can also be used. Specific examples of the carbon-based materials include natural graphite, artificial graphite, non-graphitizable carbon, and graphitizable carbon. As the negative electrode active material, the above-described materials may be used singly or in combination of arbitrary two or more thereof.

The content of the negative electrode active material in the negative electrode layer is preferably in a range of, for example, 10% by volume to 99% by volume with respect to the entire volume of the negative electrode layer. The content is more preferably in a range of 20% by volume to 99% by volume. The shape of the negative electrode active material can be, for example, a particle shape, a foil shape, or a film shape. In a case where the shape of the negative electrode active material is a particle shape, the average particle size thereof is preferably in a range of, for example, 0.05 μm to 50 μm.

The negative electrode layer may further contain at least one of an electron conduction auxiliary or a binder in addition to the negative electrode active material and the lithium-ion conductive material. As the electron conduction auxiliary and the binder, those used in the positive electrode layer described above can be used in the same manner.

The negative electrode layer can be fabricated by mixing the components (the above-described negative electrode active material, lithium-ion conductive material, electron conduction auxiliary, binder and the like) and molding the mixture. At this time, sintering may be performed if necessary. The method for mixing the components of the negative electrode layer is not particularly limited, and any general powder process can be used. At this time, water or arbitrary organic solvents may be used as the dispersion solvent. The method for molding and sintering the mixture of the components of the negative electrode layer is not particularly limited, and generally known molding and sintering methods can be used. In a case where the shape of the negative electrode active material is a foil shape, a film shape, or the like, the negative electrode layer may be formed by the method for forming the negative electrode layer described above, but the negative electrode active material itself may be regarded as the negative electrode layer by itself. The negative electrode layer may be fabricated on the solid electrolyte layer. In this case, sintering of the negative electrode layer can be performed in the form of integral sintering with the solid electrolyte layer. Here, integral sintering is a method in which one of the "lithium-ion conductive material constituting the solid electrolyte layer to be described later" or the "mixture of the components of the negative electrode layer" is first molded, the other is molded thereon, and then sintering is performed.

The negative electrode current collector for collecting electrical power of the negative electrode layer can be provided, for example, on the surface on the opposite side to the surface on which the solid electrolyte layer is disposed of the negative electrode layer. Examples of the material for the negative electrode current collector include stainless steel, copper, nickel, and carbon. Among these, stainless steel is preferable.

(Solid Electrolyte Layer)

The solid electrolyte layer is a layer interposed between the positive electrode layer and the negative electrode layer and is a layer formed of a lithium-ion conductive material.

The lithium-ion conductive material contained in the solid electrolyte layer is not particularly limited as long as it exhibits lithium-ion conductivity.

The lithium-ion conductive material contained in the solid electrolyte layer is preferably the sintered body described above (a sintered body obtained by sintering the ceramic powder material described above). The content of the sintered body in the solid electrolyte layer is not particularly limited as long as it is a proportion at which the electron conductivity can be sufficiently suppressed but is preferably in a range of, for example, 50% by volume to 100% by volume.

The solid electrolyte layer can also contain a lithium-ion conductive material other than the sintered body. Specific examples thereof include NASICON-type compounds such as $Li_{1.3}Al_{0.3}Ti_{1.7}(PO_4)_3$, $Li_{1.5}Al_{0.5}Ge_{1.5}(PO_4)_3$, $LiZr_2(PO_4)_3$, $Li_{1.2}Ca_{0.1}Zr_{1.9}(PO_4)_3$, and $Li_{1.15}Y_{0.15}Zr_{1.85}(PO_4)_3$, lithium-ion conductive oxide glass such as $Li_2O$—$B_2O_3$-based glass, $Li_2O$—$SiO_2$-based glass, $Li_2O$—$P_2O_5$-based glass, and $Li_{2.9}PO_{3.3}N_{0.46}$-based glass (LIPON), and lithium-ion conductive sulfide glass such as $Li_2S$—$B_2S_3$-based glass, $Li_2S$—$SiS_2$-based glass, and $Li_2S$—$P_2S_5$-based glass. Lithium-ion conductive oxide glass and lithium-ion conductive sulfide glass can also be crystallized and used as a glass-ceramic material.

The thickness of the solid electrolyte layer is not particularly limited as long as it is a thickness capable of preventing a short circuit of the all-solid-state lithium-ion secondary battery but can be, for example, in a range of 0.1 μm to 1,000 μm. Among these, the thickness is preferably in a range of 0.1 μm to 300 μm.

The solid electrolyte layer can be fabricated by molding and sintering the above-described lithium-ion conductive material. The method for molding and sintering the lithium-ion conductive material constituting the solid electrolyte layer is not particularly limited, and generally known molding and sintering methods can be used. The sintering temperature is not particularly limited but is preferably a temperature in a range of 700 to 1,200° C., more preferably a temperature in a range of 700 to 1,100° C., still more preferably a temperature in a range of 700 to 1,000° C., for example, in a case where the lithium-ion conductive material is the above-described ceramic powder material. However, 1,050° C. or less is preferable and 1,000° C. or less is more preferable from the viewpoint of suppressing the decomposition reaction involving melting and volatilization of Li. The sintering density of the solid electrolyte layer is preferably 60% or more, more preferably 70% or more, still more preferably 80% or more, and yet still more preferably 90% or more with respect to the theoretical density. This is because the resistance can be further suppressed as the sintering density is higher. When sintering of the solid electrolyte layer is performed, it is preferable to perform integral sintering with at least one of the above-described positive electrode layer or negative electrode layer. This is because the resistance at the layer interface can be lowered by integral sintering.

(Configuration of all-Solid-State Lithium-Ion Secondary Battery)

The shape of the all-solid-state lithium-ion secondary battery can be, for example, a coin type, a laminate type, a cylindrical type, or a square type.

The method for producing the all-solid-state lithium-ion secondary battery of the present embodiment is not particularly limited as long as it is a method capable of constructing the all-solid-state lithium-ion secondary battery described above, and a method similar to the general method for producing an all-solid-state lithium-ion secondary battery can be used. For example, the all-solid-state lithium-ion secondary battery of the present embodiment is produced by laminating the above-described positive electrode layer, solid electrolyte layer, and negative electrode layer in this order.

According to the all-solid-state lithium-ion secondary battery of the present embodiment, the sintered body described above is contained, thus the internal resistance of the battery is suppressed by the high lithium-ion conductance of the garnet-type compound and the battery performance such as rate characteristics is improved. The ceramic powder material is in the form of fine particles, and thus the contact interface with the electrode active material can be sufficiently secured as the ceramic powder material is contained in the electrode layer. Consequently, the ion conduction path to the electrode active material is favorably constructed, the proportion of the electrode active material which cannot contribute to the battery reaction decreases, and thus the energy density of the battery is improved.

In the embodiment described above, a case where the above-described ceramic powder material is used in an all-solid-state lithium-ion secondary battery has been described. However, the battery according to the present invention is not limited to the all-solid-state lithium-ion secondary battery as long as the battery contains a sintered body obtained by sintering the above-described ceramic powder material.

EXAMPLES

Hereinafter, the present invention will be described in detail with reference to Examples, but the present invention is not limited to the following Examples as long as the gist thereof is not deviated.

The maximum value and the minimum value of the content of each component shown in the following Examples should be considered as a preferable minimum value and a preferable maximum value of the present invention regardless of the content of other components.

In addition, the maximum value and the minimum value of the measured values shown in the following Examples should be considered to be the preferred minimum value and maximum value of the present invention regardless of the content (composition) of each component.

[Raw Materials]

The following raw materials were prepared for producing the ceramic powder materials of Examples.

<La Source>

Aqueous lanthanum nitrate solution (La concentration: 16% by mass)

<Zr Source>

Aqueous ammonium zirconium carbonate solution (Zr concentration: 10% by mass)

<Nb Source>

Aqueous ammonium niobium oxalate solution (Nb concentration: 5% by mass)

Composition formula: $[NH_4(NbO(C_2O_4)_2(H_2O)_2)(H_2O)_3]$

<Al Source>

Aqueous aluminum nitrate solution (Al concentration: 10% by mass)

<Ga Source>

Aqueous gallium nitrate solution (Ga concentration: 10% by mass)

<Li Source>

Lithium hydroxide monohydrate (powder)

<Ta Source>

Tantalum oxide (Mitsuwa Chemicals Co., Ltd., 99.9%)

The following raw materials were prepared for producing the ceramic powder material of Comparative Example 1.

$Li_2CO_3$: manufactured by Kojundo Chemical Laboratory Co., Ltd.

La(OH)$_3$: manufactured by Kojundo Chemical Laboratory Co., Ltd.

ZrO$_2$: manufactured by Daiichi Kigenso Kagaku Kogyo Co., Ltd., product name "UEP"

Nb$_2$O$_5$: manufactured by CBMM

A zirconium-containing compound usually contains a hafnium component as an unavoidable component. Hafnium is contained in the raw materials and the ceramic powder materials obtained in the following Examples and Comparative Examples at a proportion to zirconium of 0.03 as a molar ratio (number of moles of Hf/number of moles of Zr). In the ceramic powder material produced, the hafnium component is not observed as an impurity compound but is considered to exist at the zirconium position in the crystal structure of the ceramic powder material. Consequently, in the following Examples and Comparative Examples, the Zr concentration is expressed as the sum of the concentrations of zirconium and hafnium unless otherwise stated. Zr in the composition ratio means the sum of zirconium and hafnium.

[Preparation of Ceramic Powder Material]

Example 1

<Preparation of Precursor Oxide>

Ammonium hydrogencarbonate (50.0 g) was dissolved in 200 g of water, and 50.32 g of an aqueous ammonium niobium oxalate solution was then added thereto. To the solution, 84.19 g of an aqueous lanthanum nitrate solution was added dropwise at a rate of 8.5 g/min while maintaining the temperature at 40° C. to obtain a precipitate A (first step). Thereafter, 44.69 g of an aqueous ammonium zirconium carbonate solution was added dropwise to the obtained precipitate A at a rate of 0.5 g/min while maintaining the temperature at 40° C. to obtain a slurry containing a precipitate B (second step). Next, the pH of the slurry was adjusted using ammonia water so that the pH fell within a range of 9 to 11, and then the slurry was heated at 90° C. for 180 minutes.

The obtained slurry containing the precipitate B was suction-filtered, the filtered substance was washed with pure water, water was removed, and the precipitate B was thus separated from the slurry. The obtained precipitate B was calcined at 750° C. for 5 hours to obtain a precursor oxide (third step).

<Preparation of Garnet-Type Compound>

The precursor oxide and 8.81 g of lithium hydroxide monohydrate were pulverized and mixed in a ball mill (fourth step). Thereafter, the pulverized mixture was calcined at 800° C. for 3 hours (fifth step) to obtain a garnet-type compound.

This garnet-type compound was used as the ceramic powder material according to Example 1. The composition of the ceramic powder material calculated from the respective raw materials is as presented in Table 1.

Example 2

<Preparation of Precursor Oxide>

Ammonium hydrogencarbonate (50.0 g) was dissolved in 200 g of water. A mixed solution of 83.28 g of an aqueous lanthanum nitrate solution and 2.16 g of an aqueous aluminum nitrate solution was added dropwise thereto at a rate of 8.5 g/min to obtain a precipitate A (first step). Thereafter, 58.87 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9.5 to 10, and then the slurry was heated at 90° C. for 180 minutes.

The obtained slurry containing the precipitate B was suction-filtered, the filtered substance was washed with pure water, water was removed, and the precipitate B was thus separated from the slurry. The obtained precipitate B was calcined at 750° C. for 5 hours to obtain a precursor oxide (third step).

<Preparation of Garnet-Type Compound>

The precursor oxide and 8.80 g of lithium hydroxide monohydrate were pulverized and mixed in a ball mill (fourth step). Thereafter, the pulverized mixture was calcined at 800° C. for 3 hours (fifth step) to obtain a garnet-type compound.

This garnet-type compound was used as the ceramic powder material according to Example 2.

Example 3

<Preparation of Precursor Oxide>

Ammonium hydrogencarbonate (50.0 g) was dissolved in 200 g of water. A mixed solution of 83.74 g of an aqueous lanthanum nitrate solution and 2.25 g of an aqueous aluminum nitrate solution was added dropwise thereto at a rate of 8.5 g/min to obtain a precipitate A (first step). Thereafter, 59.20 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9.5 to 10, and then the slurry was heated at 90° C. for 180 minutes.

The obtained slurry containing the precipitate B was suction-filtered, the filtered substance was washed with pure water, water was removed, and the precipitate B was thus separated from the slurry. The obtained precipitate B was calcined at 750° C. for 5 hours to obtain a precursor oxide (third step).

<Preparation of Garnet-Type Compound>

The precursor oxide and 8.39 g of lithium hydroxide monohydrate were pulverized and mixed in a ball mill (fourth step). Thereafter, the pulverized mixture was calcined at 800° C. for 3 hours (fifth step) to obtain a garnet-type compound.

This garnet-type compound was used as the ceramic powder material according to Example 3.

Example 4

<Preparation of Precursor Oxide>

Ammonium hydrogencarbonate (50.0 g) was dissolved in 200 g of water. A mixed solution of 82.69 g of an aqueous lanthanum nitrate solution and 5.53 g of an aqueous gallium nitrate solution was added dropwise thereto at a rate of 8.5 g/min to obtain a precipitate A (first step). Thereafter, 58.46 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9.5 to 10, and then the slurry was heated at 90° C. for 180 minutes.

The obtained slurry containing the precipitate B was suction-filtered, the filtered substance was washed with pure water, water was removed, and the precipitate B was thus separated from the slurry. The obtained precipitate B was calcined at 750° C. for 5 hours to obtain a precursor oxide (third step).

<Preparation of Garnet-Type Compound>

The precursor oxide and 8.32 g of lithium hydroxide monohydrate were pulverized and mixed in a ball mill (fourth step). Thereafter, the pulverized mixture was calcined at 800° C. for 3 hours (fifth step) to obtain a garnet-type compound.

This garnet-type compound was used as the ceramic powder material according to Example 4.

Example 5

<Preparation of Precursor Oxide>

Ammonium hydrogencarbonate (50.0 g) was dissolved in 200 g of water. To the solution, 59.27 g of an aqueous lanthanum nitrate solution was added dropwise at a rate of 8.5 g/min to obtain a precipitate A (first step). Thereafter, 33.57 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9 to 11, and then the slurry was heated at 90° C. for 180 minutes.

The obtained slurry containing the precipitate B was suction-filtered, the filtered substance was washed with pure water, water was removed, and the precipitate B was thus separated from the slurry. The obtained precipitate B was calcined at 800° C. for 5 hours to obtain a precursor oxide (third step).

<Preparation of Garnet-Type Compound>

The precursor oxide, 6.59 g of lithium hydroxide monohydrate, and 2.01 g of tantalum oxide were pulverized and mixed in a ball mill (fourth step). Thereafter, the pulverized mixture was calcined at 800° C. for 3 hours (fifth step) to obtain a garnet-type compound.

This garnet-type compound was used as the ceramic powder material according to Example 5.

Comparative Example 1

First, 17.26 g of $Li_2CO_3$, 40.76 g of $La(OH)_3$, 13.67 g of $ZrO_2$, and 4.75 g of $Nb_2O_5$ were weighed, and mixed and pulverized in ethanol for 1 hour by a planetary ball mill (300 rpm/zirconia balls). The mixed powder was separated from the balls and ethanol, and then dried at 90° C. for 24 hours. Thereafter, firing was performed in an air atmosphere at 950° C. for 1 hour in a crucible made of $Al_2O_3$ to obtain a compound of Comparative Example 1. This compound was used as the ceramic powder material according to Comparative Example 1.

[SEM Image]

Figure 2:
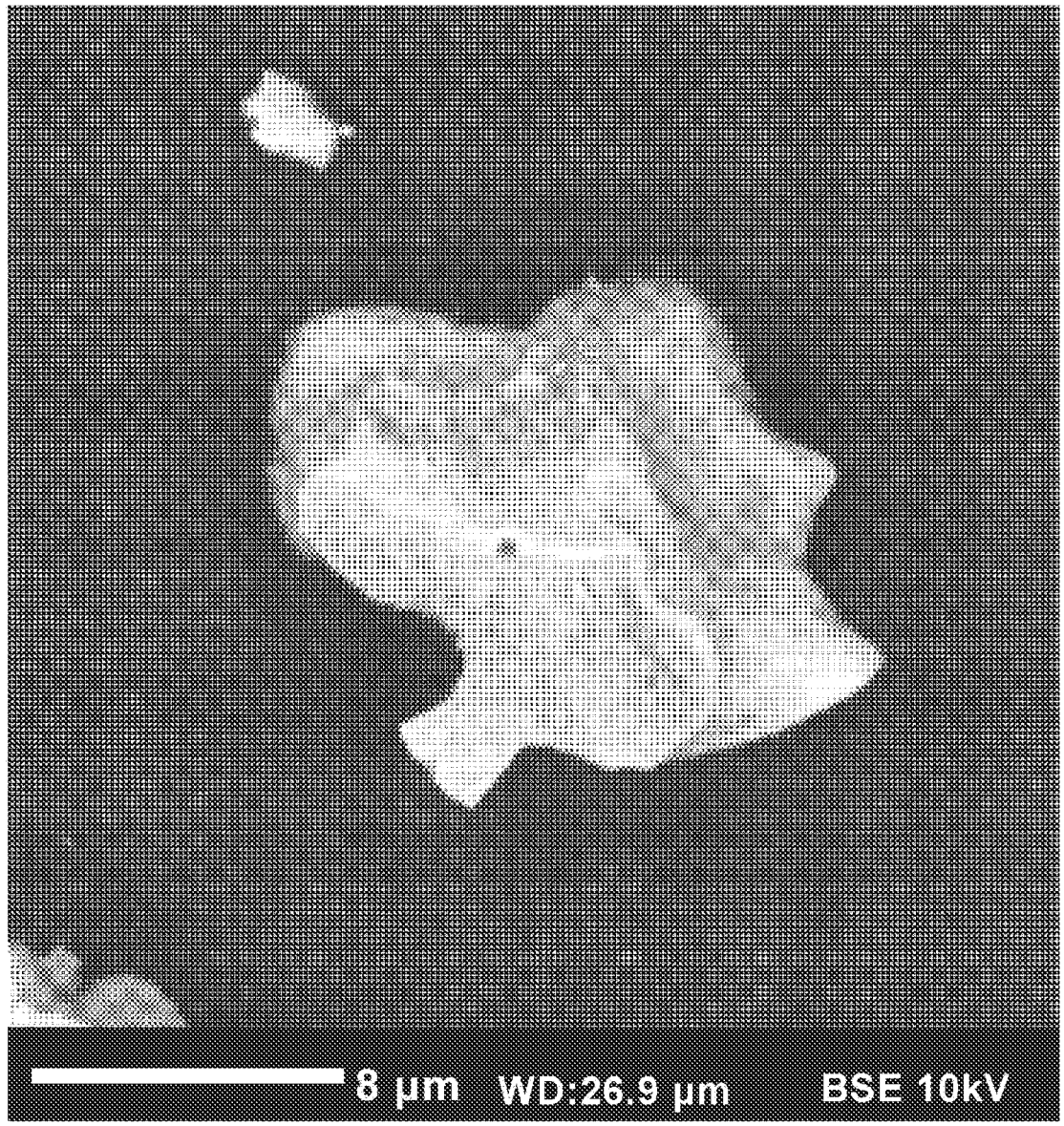
FIG. 2 is an SEM image of a ceramic powder material obtained in Comparative Example 1.

FIG. 1 shows an SEM image of the ceramic powder material obtained in Example 1, and FIG. 2 shows an SEM image of the ceramic powder material obtained in Comparative Example 1. In the SEM image, the black part of the background is the carbon tape used for fixing the powder material and the ceramic powder material does not exist at the black part.

As shown in FIG. 1, it was confirmed that the ceramic powder material of Example 1 was particles having many voids and a low density. On the other hand, it was confirmed that the ceramic powder material of Comparative Example 1 was particles having no voids and a high density.

[Identification of Crystal Phases]

(Crystal Phase of Ceramic Powder Material Before Heat Treatment)

X-ray diffraction spectra of the ceramic powder materials of Examples and Comparative Examples were obtained using an X-ray diffractometer ("RINT2500" manufactured by Rigaku Corporation). The measurement conditions were set as follows.

<Measurement Conditions>

Measuring apparatus: X-ray diffractometer (RINT2500, manufactured by Rigaku Corporation)
Radiation source: CuKα radiation source
Tube voltage: 50 kV
Tube current: 300 mA
Scanning speed: 4° (2e)/min As a result of the X-ray diffraction spectrum measurement, it was confirmed that the ceramic powder materials of Examples and Comparative Examples had a garnet-type structure.

[Measurement of Pore Volume]

The pore distribution of the ceramic powder material of each of Examples and Comparative Examples was obtained by a mercury intrusion method using a pore distribution measuring apparatus ("Autopore IV9500" manufactured by Micromeritics Instrument Corporation). The measurement conditions were set as follows. As a pretreatment for the measurement, the ceramic powder material was dried under reduced pressure at 200° C. for 3 hours.

<Measurement Conditions>

Measuring apparatus: pore distribution measuring apparatus (Autopore IV9500 manufactured by Micromeritics Instrument Corporation)
Sampling amount: 0.5 to 0.7 g
Measurement range: 0.0036 to 10.3 μm
Number of measurement points: 120 points
Mercury contact angle: 140 degrees
Mercury surface tension: 480 dyne/cm
Measurement temperature: 25° C.
Measurement pressure: 0.0155 to 27.46 MPa The pore volume, the pore specific surface area, and the average pore size were determined using the obtained pore distribution. The results are shown in Table 1.

[Measurement of Specific Surface Area]

The specific surface area of the ceramic powder material of each of Examples and Comparative Examples was measured by the BET method using a specific surface area meter ("Macsorb", manufactured by Mountech Co., Ltd.). The results are shown in Table 1.

TABLE 1

| Sample | Composition $[Li_{7-(3x+y)}M1_x La_3 Zr_{2-y} M2_y O_{12}]$ | | | | | Pore volume cm$^3$/g | Pore specific surface area m$^2$/g | Average pore size μm | Specific surface area m$^2$/g |
|---|---|---|---|---|---|---|---|---|---|
| | M1 | M2 | x | y | Excess Li % | | | | |
| Example 1 | — | Nb | 0 | 0.5 | 0 | 0.67 | 1.10 | 2.43 | 0.8 |
| Example 2 | Al | — | 0.25 | 0 | 5 | 0.86 | 1.23 | 2.77 | 0.9 |
| Example 3 | Al | — | 0.26 | 0 | 0 | 0.86 | 1.32 | 2.61 | 0.7 |
| Example 4 | Ga | — | 0.25 | 0 | 5 | 0.88 | 1.18 | 2.98 | 0.8 |
| Example 5 | — | Ta | 0 | 0.4 | 5 | 0.56 | 0.59 | 3.79 | 0.6 |
| Comparative Example 1 | — | Nb | 0 | 0.5 | 5 | 0.32 | 0.23 | 5.51 | 0.3 |

[Measurement of Particle Size (Measurement of Particle Size Before Crushing Treatment)]

In a laser diffraction/scattering particle size distribution measuring apparatus ("LA-950" manufactured by HORIBA, Ltd.), 0.1 g of the ceramic powder material of each of Examples and Comparative Examples was placed, and the particle size was measured. The results are shown in Table 2. The integrated fraction is also shown in Table 2. In Table 2, "≤1 μm" indicates an integrated fraction of a particle size of 1 μm or less, "≤5 μm" indicates an integrated fraction of a particle size of 5 μm or less, and "≤10 μm" indicates an integrated fraction of a particle size of 10 μm or less.

Conditions of the measuring apparatus were set as follows.
Dispersion medium: ion-exchanged water
Refractive index: 2.09
Particle size standard: volume
Measurement upper limit: 3,000 μm
Measurement lower limit: 0.01 μm

[Measurement of Particle Size after Crushing Treatment]

In a 100 mL beaker, 40 mL of pure water and 0.1 g of ceramic powder material of each of Examples and Comparative Examples were placed, and a homogenizer treatment was performed. The homogenizer treatment was performed for 5 minutes under the following <Crushing conditions> using an ultrasonic homogenizer manufactured by Branson: product name Digital Sonifier model 250. Thereafter, the particle size was measured in the same manner as in the measurement of the particle size before the crushing treatment. The results are shown in Table 2.

<Crushing Conditions>
Transmission frequency: 20 kHz
High frequency output: 200 W
Amplitude control: 40±5%

<Crushing Condition 2>
The sample obtained in Example 1 was pulverized using a bead mill.
Apparatus name: RMB II (manufactured by AIMEX Co., Ltd.)
Solvent: toluene
Vessel volume: 300 mL
Beads: zirconia beads
Bead diameter: φ 0.3 mm
Solid content concentration: 15% by mass
Peripheral speed: 12 m/s
Treatment time: 60 minutes

The invention claimed is:

1. A ceramic powder material comprising a garnet-type compound containing Li, wherein the ceramic powder material has a pore volume of 0.4 mL/g or more and 1.0 mL/g or less.

2. The ceramic powder material according to claim 1, wherein the ceramic powder material has an average pore size of 0.5 μm or more and 5 μm or less.

3. The ceramic powder material according to claim 1, wherein the ceramic powder material has a specific surface area of 0.5 m$^2$/g or more and 2.5 m$^2$/g or less.

4. The ceramic powder material according to claim 1, wherein the ceramic powder material has a particle size $D_{50}$ of 0.5 μm or more and 50 μm or less.

5. The ceramic powder material according to claim 1, wherein the garnet-type compound is represented by Formula [1] below:

$$Li_{7-(3x+y)}M1_xLa_3Zr_{2-y}M2_yO_{12} \qquad [1]$$

where M1 is Al or Ga, M2 is Nb or Ta, x is a number satisfying 0≤x≤0.35, and y is a value satisfying 0≤y≤1.0.

TABLE 2

| Sample | Crushing treatment | Particle size/μm | | | | | Integrated fraction/% | | |
|---|---|---|---|---|---|---|---|---|---|
| | | $D_{10}$ | $D_{50}$ | $D_{90}$ | Mode | Average. | ≤1 μm | ≤5 μm | ≤10 μm |
| Example 1 | Absence | 7.1 | 29.9 | 151.3 | 10.9 | 59.0 | 0.00 | 3.85 | 20.75 |
| | Presence | 2.7 | 6.7 | 12.3 | 7.2 | 7.2 | 1.68 | 31.77 | 80.05 |
| Example 2 | Absence | 5.4 | 11.3 | 116.3 | 10.8 | 33.9 | 0.00 | 8.34 | 42.70 |
| | Presence | 2.3 | 5.1 | 8.7 | 5.5 | 5.3 | 1.76 | 50.26 | 95.44 |
| Example 3 | Absence | 7.1 | 18.1 | 171.7 | 12.4 | 54.6 | 0.00 | 3.56 | 23.19 |
| | Presence | 2.7 | 6.2 | 11.2 | 7.1 | 6.6 | 1.53 | 35.61 | 85.44 |
| Example 4 | Absence | 5.5 | 11.8 | 110.6 | 10.8 | 34.0 | 0.00 | 7.84 | 40.19 |
| | Presence | 1.9 | 4.5 | 7.9 | 5.4 | 4.8 | 2.48 | 59.79 | 97.43 |
| Example 5 | Absence | 10.1 | 33.0 | 161.5 | 16.3 | 60.8 | 0.00 | 1.17 | 10.06 |
| | Presence | 4.4 | 8.4 | 14.3 | 8.3 | 9.0 | 0.00 | 15.30 | 66.20 |
| Comparative Example 1 | Absence | 13.6 | 68.7 | 223.0 | 162.8 | 97.6 | 0.00 | 0.83 | 5.39 |
| | Presence | 10.7 | 23.3 | 43.5 | 24.5 | 25.7 | 0.00 | 1.39 | 8.61 |

(Reference)

The ceramic powder material of the present example can be atomized by the crushing treatment under relatively gentle conditions as described above. Hereinafter, for reference, the value of the particle size $D_{50}$ measured when the ceramic powder material of the present Example 1 is crushed (pulverized) by a strong crushing (pulverization) method is shown.

[Measurement of Particle Size after Strong Crushing (Pulverization) Treatment (Reference)]

The sample of Example 1 was pulverized under the following <Crushing condition 2>. Thereafter, the particle size was measured in the same manner as in the measurement of the particle size before the crushing treatment. As a result, the particle size $D_{50}$ of the sample of Example 1 pulverized under the crushing condition 2 was 0.27 μm.

6. The ceramic powder material according to claim 1, wherein the ceramic powder material has a particle size Dso after a crushing treatment below of 0.1 μm or more and 10 μm or less:

<Crushing Treatment>
0.1 g of the ceramic powder material is added to 40 mL of pure water, and a homogenizer treatment is performed for 5 minutes under <crushing conditions> below using an ultrasonic homogenizer, product name Digital Sonifier model 250 manufactured by Branson;

<Crushing Conditions>
a transmission frequency is 20 kHz;
a high frequency output is 200 W; and
an amplitude is controlled in a range of 40±5%.

7. A method for producing the ceramic powder material according to claim 1, comprising:
- a first step of mixing a solution of a carbonic acid species with a solution containing a compound having La as a constituent element to obtain a solution containing a precipitate A;
- a second step of mixing a solution containing a zirconium carbonate complex with a solution containing the precipitate A to obtain a precipitate B;
- a third step of calcining the precipitate B at a temperature of 500° C. or more and 900° C. or less to obtain a precursor oxide;
- a fourth step of preparing a mixture obtained by mixing the precursor oxide and a compound containing Li as a constituent element; and
- a fifth step of calcining the mixture at a temperature of 500° C. or more and 900° C. or less to obtain a garnet-type compound.

8. A molded body obtained by crushing and then pressurizing the ceramic powder material according to claim 1.

* * * * *